US011080515B2

(12) United States Patent
Kohlmeier-Beckmann

(10) Patent No.: US 11,080,515 B2
(45) Date of Patent: *Aug. 3, 2021

(54) VIRTUAL WINDOW DEVICE AND METHOD FOR OPERATING A VIRTUAL WINDOW DEVICE

(71) Applicant: Airbus Operations GmbH, Hamburg (DE)

(72) Inventor: Carsten Kohlmeier-Beckmann, Hamburg (DE)

(73) Assignee: Airbus Operations GmbH

( * ) Notice: Subject to any disclaimer, the term of this patent is extended or adjusted under 35 U.S.C. 154(b) by 0 days.

This patent is subject to a terminal disclaimer.

(21) Appl. No.: 16/744,520

(22) Filed: Jan. 16, 2020

(65) Prior Publication Data

US 2020/0151426 A1     May 14, 2020

Related U.S. Application Data

(63) Continuation of application No. 15/689,458, filed on Aug. 29, 2017, now Pat. No. 10,579,861.

(30) Foreign Application Priority Data

Sep. 7, 2016   (EP) ..................................... 16187650

(51) Int. Cl.
*G06K 9/00*            (2006.01)
*G06F 3/01*             (2006.01)
(Continued)

(52) U.S. Cl.
CPC .......... *G06K 9/00255* (2013.01); *G06F 3/011* (2013.01); *G06F 3/012* (2013.01); *G06F 3/0304* (2013.01); *G06K 9/00288* (2013.01); *G09G 5/00* (2013.01); *G09G 5/14* (2013.01); *H04N 5/247* (2013.01); *H04N 13/279* (2018.05);
(Continued)

(58) Field of Classification Search
CPC ........ G06F 3/011; G06F 3/012; G06F 3/0304; G06K 9/00255; G06K 9/00288; G09G 2340/04; G09G 2340/14; G09G 2354/00; G09G 2380/10; G09G 2380/12;
(Continued)

(56) References Cited

U.S. PATENT DOCUMENTS 6,882,358 B1 * 4/2005 Schuster ................ H04N 7/144
                                                                                         348/14.07
7,880,739 B2     2/2011   Long et al.
(Continued)

OTHER PUBLICATIONS

EP 16187650.3 Search Report dated Mar. 23, 2017.

*Primary Examiner* — Francis Geroleo
(74) *Attorney, Agent, or Firm* — Lerner, David, Littenberg, Krumholz & Mentlik, LLP

(57) ABSTRACT

A virtual window device, particularly for use in an airplane, includes a bezel, or a frame, with a display arranged within the bezel, or within the frame; a distance sensor unit configured to produce at least one first distance signal indicating a first distance to an object; a first camera unit configured to capture a live video of a real scene; and a computing unit configured to select, based at least on the at least one first distance signal, a section of the live video of the real scene captured by the first camera unit; wherein the computing unit is further configured to control the display to display the selected section.

9 Claims, 9 Drawing Sheets

(51) Int. Cl.
*G09G 5/00* (2006.01)
*G06F 3/03* (2006.01)
*H04N 13/279* (2018.01)
*G09G 5/14* (2006.01)
*H04N 5/247* (2006.01)
*H04N 13/366* (2018.01)

(52) U.S. Cl.
CPC ..... *G09G 2340/04* (2013.01); *G09G 2340/14* (2013.01); *G09G 2354/00* (2013.01); *G09G 2380/10* (2013.01); *G09G 2380/12* (2013.01); *H04N 13/366* (2018.05)

(58) Field of Classification Search
CPC .......... G09G 5/00; G09G 5/14; H04N 13/279; H04N 13/366; H04N 5/247
See application file for complete search history.

(56) References Cited

U.S. PATENT DOCUMENTS

| | | |
|---|---|---|
| 9,342,467 B1 | 5/2016 | McGrath et al. |
| 9,864,559 B2 | 1/2018 | Sizelove |
| 10,131,431 B2 | 11/2018 | Grant |
| 2004/0217234 A1 | 11/2004 | Jones et al. |
| 2004/0217978 A1 | 11/2004 | Humphries |
| 2009/0195652 A1 | 8/2009 | Gal |
| 2010/0157063 A1 | 6/2010 | Basso et al. |
| 2010/0188506 A1 | 7/2010 | Dwyer et al. |
| 2012/0242798 A1 | 9/2012 | McArdle et al. |
| 2012/0325962 A1 | 12/2012 | Barron |
| 2013/0128012 A1 | 5/2013 | Turner |
| 2013/0169807 A1 | 7/2013 | de Carvalho et al. |
| 2014/0085337 A1 | 3/2014 | Velten et al. |
| 2014/0160285 A1 | 6/2014 | Barrou et al. |
| 2014/0320668 A1 | 10/2014 | Kalevo et al. |
| 2015/0009119 A1* | 1/2015 | Zuccarino ............. G06F 3/0304 345/156 |
| 2015/0077337 A1 | 3/2015 | Coto-Lopez et al. |
| 2015/0243085 A1 | 8/2015 | Newhouse et al. |
| 2015/0363656 A1* | 12/2015 | Brauer ............... B64D 11/0015 348/77 |
| 2016/0325836 A1 | 11/2016 | Teo |
| 2017/0098133 A1 | 4/2017 | Brauer |
| 2017/0280124 A1* | 9/2017 | Ahlborn ............... H04N 13/117 |

* cited by examiner

VIRTUAL WINDOW DEVICE AND METHOD FOR OPERATING A VIRTUAL WINDOW DEVICE

CROSS-REFERENCE TO RELATED APPLICATION

The present application is a continuation of U.S. patent application Ser. No. 15/689,458, filed on Aug. 29, 2017, the disclosure of which is hereby incorporated herein by reference.

FIELD OF THE INVENTION

The present invention pertains to a virtual window device and a method for operating a virtual window device. A virtual window device can be considered to be any system or apparatus that mimics an actual window, e.g. an unblocked or transparently sealed opening within a wall, without there being an actual opening in said wall. The picture or scene that the virtual window device displays or projects to achieve this may be called a virtual window.

Although applicable for any kind of wall, the present invention and the corresponding underlying problems will be explained in further detail in conjunction with an external wall of an aircraft. Similarly, however, the present invention may be applied to, or used in, rooms, especially windowless rooms, in particular windowless rooms in vehicles, for example windowless rooms in boats, airplanes, submarines and so on. The present invention may also be applied to, or used in, rooms of buildings, in particular such rooms that have no actual windows, for example, subterranean rooms.

BACKGROUND OF THE INVENTION

Windows do not only provide a person on one side of the window with awareness of the events on the other side of the window, they may also improve a level of comfort that a person experiences within the room or space provided with the window. In many cases, however, because of structural or other considerations, an actual window cannot be provided at all, or without large effort or causing unwanted additional effects. In such cases virtual windows can be provided that mimic actual windows. In this way, for example, a sturdier wall, without an opening or a window bezel, may be provided while still affording many advantages of actual windows.

U.S. Pat. No. 7,880,739 B2 describes a virtual window with simulated parallax and field of view change.

BRIEF SUMMARY OF THE INVENTION

It is an idea of the present invention to provide an improved virtual window device that mimics actual windows especially closely. Particularly, it is an idea of the invention to improve the seamlessness and the impression of reality of the scene displayed by the virtual window device. Another idea is to provide a virtual window device with better handling of a situation in which multiple persons are adjacent to the virtual window device.

According to a first aspect of the invention, a virtual window device comprises a bezel or a frame with a display arranged within the bezel or the frame; a distance sensor unit configured to produce at least one first distance signal indicating a first distance to an object; a first camera unit configured to capture a live video of a real scene; and a computing unit configured to select, based at least on the at least one first distance signal, a section of the live video of the real scene captured by the first camera unit; wherein the computing unit is further configured to control the display to display the selected section of the live video of the real scene captured by the first camera unit.

The object to which the first distance is determined and indicated can be an object with a predetermined pattern, in particular a person or a part of a person, especially a face of a person.

The first distance indicated by the first distance signal can be a distance between the object and a predetermined point closely related to the distance sensor unit, for example, an antenna of the distance sensor unit. The first distance indicated by the first distance signal may therefore be a distance between the object and the distance sensor unit or a sub-unit of the distance sensor unit.

According to a second aspect of the present invention, a vehicle with a virtual window device according to the present invention is provided. The vehicle may in particular be an airplane, a train, or a boat.

According to a third aspect of the present invention, a method for operating a virtual window device is provided, the method comprising the steps of: determining a distance between an object and a reference point; capturing a live video of a real scene; selecting, based at least on the determined distance, a section of the captured live video of the real scene; and controlling a display of a virtual window device to display the selected section.

The object to which the distance is determined and indicated can be an object with a predetermined pattern, in particular a person or a part of a person, especially a face of a person.

The reference point may, in particular, be a point arranged at, or adjacent to, the display of the virtual window device, for example at a geometrical center of the display, e.g. its center of mass. The reference point may alternatively be located at the location of a distance sensor element.

One underlying idea of the present invention is to provide to a person on one side of the virtual window device with the impression that the person does not perceive a virtual window but an actual window to a scene located on the other side of the virtual window device. In particular, it is aimed to provide a virtual window device such, and/or to operate a virtual window device such, that the scene perceived by the user may change with the distance of the user to the virtual window device and/or with the orientation of the face of the user compared to the virtual window device in the same way as the actual view through an actual window would change for the user, if the display of the virtual window device was an actual window.

For example, a room, or a vessel may be designed without actual windows, i.e. to be able to provide a continuous armored wall of the room or vessel. Using the present invention, the people inside the room or vessel are enabled to freely naturally perceive the environments of the room or vessel. In some embodiments, augmented reality objects may be added to the virtual window displayed.

One great advantage is that, a live video of the real scene is captured, of which only a section is displayed by the display of the virtual window device, i.e. the data base from which the section may be selected is larger than the section itself. In this way, the display may be controlled to switch viewing angles extremely quickly, simply by selecting different sections of the live video of the real scene. For example, the first camera unit may be a 3D-camera configured to capture a live 3D video of the real scene. In this way, the artificial window displayed by the display may be rendered even more realistic.

According some embodiments of the invention, the distance sensor unit comprises a plurality of sensor elements configured to produce each an individual first distance signal indicating an individual distance to the object. In particular, the sensor elements of the plurality of sensor elements may be configured to produce the individual first distance signal such that it indicates an individual distance between the object and a predetermined point for each sensor element, in particular a predetermined point at each sensor element, for example an antenna of the sensor element.

The computing unit may be configured to calculate a position signal indicating a position of the object with respect to a reference point based on the individual first distance signals, for example, by triangulation. The computing unit may be configured to select the section of the live video of the real scene captured by the first camera unit based on the position signal. In this way, a simple solution is provided to determine, for example, with respect to which of a plurality of users, the users being an example for the object, the virtual window device should be controlled.

In the case that the first camera unit is a 3D camera, the section of the live 3D video of the real scene may be selected at different depth-of-view based on the calculated position signal.

According embodiments, the artificial window device comprises a second camera unit configured and arranged to capture a picture or a video of a space in front of the display. The space in front of the display may be understood as a space which is reached by the light rays generated by the display. In other words, a space faced by the display. The second camera unit may be configured and arranged to capture a solid angle of the space in front of the display, in particular directly in front of the display. In the event that the artificial window device is provided in an airplane, the second camera unit may be configured and arranged to capture a picture at least, or solely, of a space in which a user is present when said user is seated on a seat of the airplane.

The artificial window device may comprise a face recognition unit configured to recognize a face in the captured picture or video of the space in front of the display, to determine a spatial orientation of the recognized face and to produce a face orientation signal indicating at least the determined orientation of the recognized face. The computing unit may be configured to select the section of the live video of the real scene also based on the face orientation signal. In this way, the virtual window displayed by the display may be changed according to a true, or an approximated, viewing axis of the person whose face is recognized, relative to a display.

A viewing axis may be defined as a viewing axis along which a person is looking at something, e.g. at the virtual window displayed by the display.

According some embodiments, the first camera unit is arranged and configured to capture the live video of the real scene from a space behind the display. The space behind the display is to be understood as a space on the other side of the display as the space in front of the display. In particular, when the display is arranged at an interior wall of a room or a vessel, the space before the display is the space within said room or vessel, while the space behind the display is the space on the outside of said room or said vessel, in particular on the other side of the wall as the display. The space behind the display may advantageously include an area that would be visible to a person through the bezel in the hypothetical case that the bezel surrounded an opening instead of the display.

The computing unit may be configured to select the section of the live video of the real scene captured by the first camera unit such that, based on the face orientation signal, the selected section is identical to a hypothetical section that a person with a face with the determined spatial orientation of the recognized face would see through the bezel, or the frame, if the bezel, or the frame, surrounded an opening or a window instead of the display. In this way, an even more realistic virtual window may be displayed to the user.

According to another embodiment, the face recognition unit is configured to recognize a plurality of faces present in the picture or video captured by the second camera unit. A distance sensor unit may be configured to produce at least one first distance signal indicating a respective first distance to each of the recognized faces. In particular, the distance sensor unit may be configured to produce at least one first distance signal indicating a respective first distance between the respective recognized face and at least one predetermined point, in particular a predetermined point located at the distance sensor unit or, in the case that the distance sensor unit comprises multiple sensor elements, to each sensor element, in particular an antenna of each sensor element.

A computing unit may be configured to determine, based at least on the at least one first distance signal for each recognized face, a position signal indicating position of each recognized face with respect to a common reference point. The position signal may simple comprise information about the distance of the face from the reference point, or may comprise detailed information about the relative position of the face with respect to the reference point.

The computing unit may further be configured to select the section of the real scene captured by the first camera unit also based on the position signals. In this way, for example, a prioritized list of different persons (to which the recognized faces belong) can be created. The virtual window displayed by the display can then be adapted to comply with the viewing axis of the person at the top of the prioritized list.

According to another embodiment, the face recognition unit is configured to produce a plurality of face orientation signals indicating a spatial orientation of the respective recognized face of each of the recognized faces. The computing unit may further be configured to select the section of the live video of the real scene captured by the first camera unit also based on the plurality of face orientation signals. In this way, a prioritized list of the recognized faces may be created taking into account that it may be more important to adapt the virtual window to the true, or approximated, viewing axis of a person that is focusing on the display instead of adapting the virtual window to a person that barely grazes the display with its attention.

According some embodiments, the computing unit is further configured to determine a preferred face among the plurality of recognized faces based on at least the plurality of face orientation signals and/or on the plurality of position signals. The first camera unit may be arranged and configured to capture the live video of the real scene from the area behind the display as described above. In this way, a prioritized list of the recognized faces may be created, taking into account that it may be more important to adapt the virtual window displayed by the display to the viewing axis of a person that is focusing on the display but is located at a larger distance from the display instead of adapting the virtual window to a person that barely grazes the display with its attention but is located close to the display.

The computing unit may be configured to select the section of the live video of the real scene captured by the first camera unit such that, based on the face orientation signals belonging to the preferred face, the selected section is identical to a hypothetical section of the real scene that a person with a face having the spatial orientation of the preferred face would see through the bezel, or the frame, if the bezel, or the frame, surrounded an opening or a window instead of the display. In this way, a weighting of the importance to display the virtual window adapted to the various persons (to whom the recognized faces belong) may be computed, taking into account both the proximity of the person to the display (closer persons being generally preferred over more distant persons) as well as the spatial orientation of the face of the person (orientations aimed closer at the display being generally preferred over orientations barely perceiving, or missing, the display in their field of view).

According to another embodiment, the computing unit is further configured to calculate, based on the plurality of face orientation signals, a viewing angle between a viewing axis of each recognized face and a predetermined main viewing axis of the display for each recognized face. The predetermined main viewing axis of the display may be an axis perpendicular to the surface of the display and/or arranged at the geometrical center of the display. The computing unit may be further configured to determine the preferred face based on the position signals and on the calculated viewing angles.

According to some embodiments, the computing unit may be further configured to determine a pre-selection of recognized faces containing all recognized faces with a respective position signifying a second distance of the recognized faces from the reference point below a predetermined threshold distance value, based on the position signals. For example, the pre-selection may comprise all recognized faces at a second distance of less than 5 meters from the reference point, which may be located at the display.

The computing unit may further be configured to determine the preferred face as the face within the pre-selection of recognized faces with the smallest calculated viewing angle. In other words, in the above example, from the persons within 5 m of the display, the one person (or one face) is selected as preferred, which watches the display of the artificial window device most intently, or whose viewing axis coincides most closely with the main viewing axis of the display.

According to another embodiment, the computing unit is further configured to determine a pre-selection of recognized faces containing all recognized faces with a respective calculated viewing angle below a predetermined threshold angle value. For example, the pre-selection may comprise all recognized faces that have a viewing axis arranged at thirty degrees or less with respect to the main viewing axis of the display.

The computing unit may further be configured to determine the preferred face as that face within the pre-selection of faces which is located, based on the position signal, at the smallest second distance from the reference point.

BRIEF DESCRIPTION OF THE DRAWINGS

The invention will be explained in greater detail with reference to illustrating embodiments depicted in the drawings as appended.

The accompanying drawings are included to provide a further understanding of the present invention and are incorporated in, and constitute a part of, the specification. The drawings illustrate the embodiments of the present invention and together with the description serve to explain the principles of the invention. Other embodiments of the present invention and many of the intended advantages of the present invention will be readily appreciated as they become better understood by reference to the following detailed description. Elements of the drawings are not necessarily to scale relative to each other. Like reference numerals designated corresponding similar parts.

Figure 1:
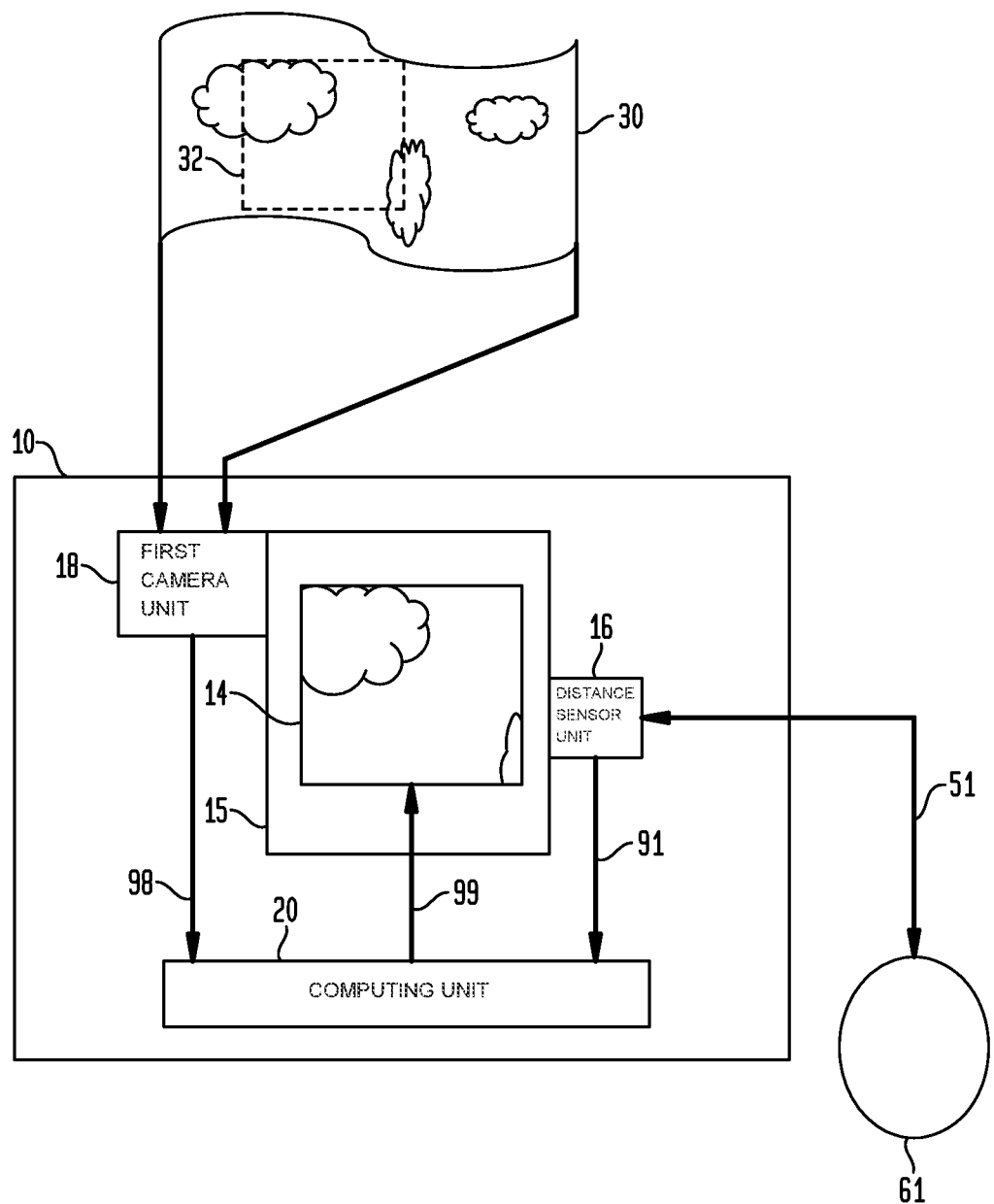
FIG. 1 shows a schematic block diagram of a virtual window device according to an embodiment of the first aspect of the present invention.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

DETAILED DESCRIPTION

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

FIG. 1 shows a schematic block diagram of a virtual window device 10 according to an embodiment of the first aspect of the present invention. In the following, the virtual window device 10 will be explained using an example wherein the virtual window device 10 is arranged in an airplane, in particular adjacent to an actual window or located between two actual windows of the airplane. It is to be understood that the virtual window device 10 may be adapted to, and used in, a large number of other rooms or vehicles.

In FIG. 1, the virtual window device 10 is displayed with a bezel 15 with a display 14 arranged within the bezel 15. The bezel 15 and the display 14 may be arranged and configured such as to mimic the appearance of an actual window, for example an airplane window. The virtual window device 10 may, apart from the bezel 15 with the display 14, comprise at least one actual window (not displayed), wherein the bezel 15 and the display 14 are configured and arranged such as to mimic the appearance of said actual window. In particular, the display 14 may be shaped in the same way as a transparent portion, for example a glass plate, arranged in the actual window.

Although here and in the following, reference is made mainly to a bezel 15, it should be understood that all virtual window devices described herein may be provided with a frame instead of the bezel 15, wherein the display 14 is arranged within the frame. Especially when the virtual window device 10 is arranged in a room of a building, the frame with the display 14 may be formed as to mimic the appearance of a window frame surrounding an actual window.

The virtual window device 10 may also be provided with a shutter configured to enable a user to partially or completely cover the bezel 15 and/or the display 14 with the shutter. In particular, the shutter may be configured and arranged with respect to the bezel 15 and the display 14 in the same way as a shutter of the actual window located next to the bezel 15 and the display 14.

The virtual window device 10 further comprises a first camera unit 18 configured to capture a live video of a real scene 30. In FIG. 1, as an example of a real scene, a cloudy sky is shown.

The first camera unit 18 is, in particular, configured to capture the live video of the real scene for a space behind the bezel 15 with the display 14. The virtual window device 10 may comprise a wall, or a wall section, in which the bezel 15 and the display 14 are arranged. The first camera unit 18 may be positioned and configured such that the live video of the real scene 30 is captured from a space on the side of said wall which is opposite to the side of said wall on which the bezel 15 and the display 14 are arranged. In the event that the virtual window device 10 is arranged on, or as part of, an aircraft, the first camera unit 18 may be arranged to capture live video from the outside of the airplane. In this way, a virtual window can be displayed to persons inside the airplane (e.g. passengers in a passenger cabin and/or a pilot in a cockpit of the airplane) that has the appearance of an actual window showing the real scene 30 in the same way as the actual windows surrounding, or adjacent to, the bezel 15 with the display 14, allow persons to look outside.

The first camera unit 18 may be a single camera device or may comprise several individual camera devices. The fields of view of the individual camera devices may overlap or at least be adjacent to each other. In this way, the entirety of the camera devices of the first camera unit 18 may be configured to capture the live video of the real scene 30. Known techniques for stitching together different views from a plurality of individual camera devices may be applied to obtain a single non-redundant live video of the real scene 30, e.g. by a CPU of the first camera unit 18.

The first camera unit 18 may be a 3D camera. Also in this case, the first camera unit may comprise, or consist of, a plurality of individual camera devices which may be configured to capture different aspects of the real scene 30, e.g. with different depths of field. Known techniques for creating 3D video data may be applied to create a live 3D video field of the real scene 30.

The virtual window device 10 further comprises a distance sensor unit 16 configured to produce at least one first distance signal 91 indicating a first distance 51 to an object 61. The distance sensor unit may comprise one or more sensor elements which may be configured as ultrasound sensor elements, light sensor elements or other known sensor elements for determining distances to objects. Each sensor element of the distance sensor unit 16 may be configured to produce one individual first distance signal 91 indicating the first distance 51 between the respective sensor element and the object 61.

The object 61 to which the first distance 51 is determined and indicated can be an object with a predetermined pattern, in particular a person or a part of a person, especially a face of a person. In the following, the invention will be described with reference to a face 61 of a person as the object. It should be understood that the methods and devices described herein may also be used with other objects or types of objects, for example, camera lenses.

The distance sensor unit 16, or at least one sensor element of the distance sensor unit 16, or at least one antenna of the distance sensor unit 16, can be arranged adjacent to the bezel 15 or the display 14, for example arranged within the display 14, in particular at a geometrical center of the display 14. In this way, an especially close relation between the first distance 51 between the face 61 and the distance sensor unit 16 or one of its sensor elements on the one hand, and the distance of the face 61 from the artificial window created by the display 14 on the other hand is established.

The virtual window device 10 further comprises a computing unit 20 configured to select, based at least on the at least one first distance signal 91, a section 32 of the live video of the real scene 30 captured by the first camera unit 18. For this, the first camera unit 18 is configured to create, and transmit to the computing unit 20, a video signal 98 corresponding to the live video of the real scene 30.

The computing unit 20 is configured to control the display 14 to display the selected section 32 of the real scene 30, that is, the display 14 is controlled to display only the selected section 32. In order to control the display 14, the computing unit 20 creates a control signal 99 and transmits the control signal 99 to the display 14.

The computing unit 20 is configured to select the section 32 based on the measured first distance 51. In particular, the computing unit 20 may be configured to select a larger section 32 from the captured live video of the real scene 30 if the first distance 51 to the face 61 is smaller and to select a smaller part of the captured live video of the real scene 30 as the section 32 when the distance 51 to the face 61 is larger. In this way, the display 14 is controlled to create for a person with the face 61 the impression of gaining a wider solid angle of view 34 through the artificial window when coming closer to the artificial window, just as a solid angle of view 34 through an actual window of the person would widen when said person came closer to that actual window.

In the case that the virtual window device 10 is equipped with a shutter, the computing unit 20 may be configured to shut the display 14 off in the event that the shutter is closed completely or at least to a predetermined degree.

Figure 2:
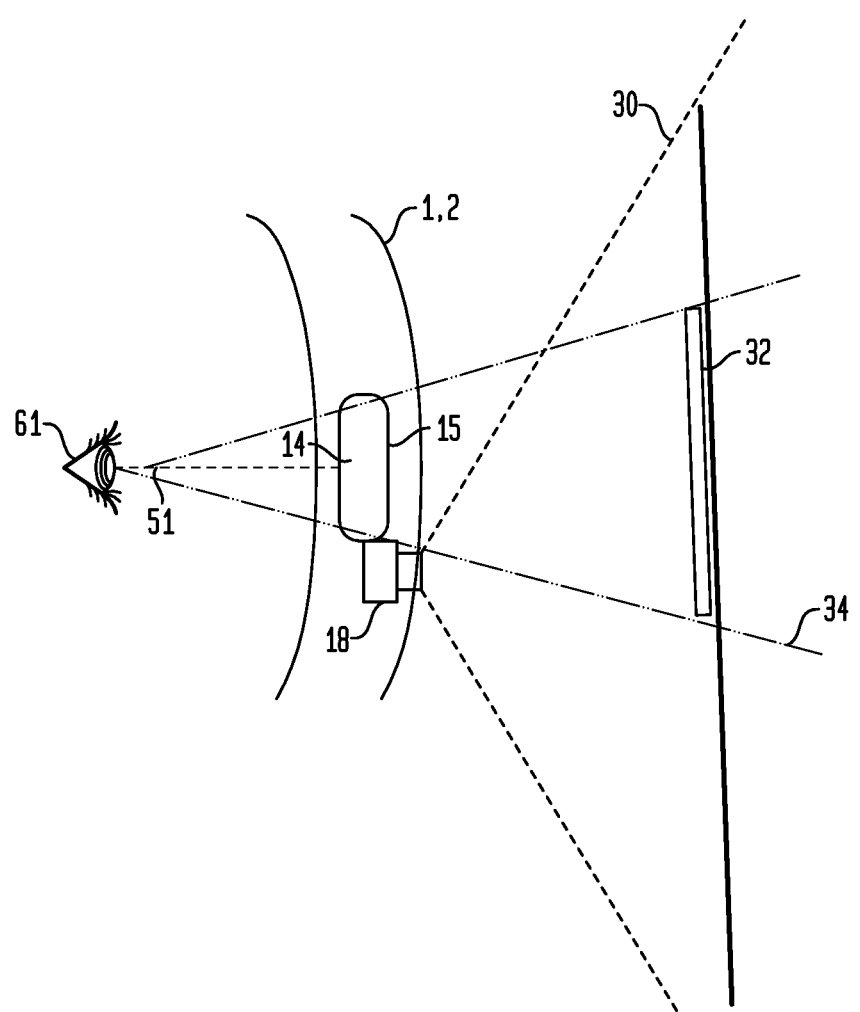
FIG. 2 shows a schematic diagram illustrating the function of the virtual window device of FIG. 1.

FIG. 2 shows a schematic diagram illustrating the function of the virtual window device 10 according to FIG. 1.

As an example, in FIG. 2, the bezel 15 with the display 14 is shown as arranged within, or attached to, a wall 2 of an airplane 1 (not shown in its entirety), facing inward. Also the first camera unit 18 is arranged within, or attached to, the external wall 2 of the airplane 1, facing outward. FIG. 2 illustrates that, although the first camera unit 18 captures a scene 30 within a comparatively large solid angle, the display 14 is controlled so as to display only the selected section 32 which the person with the face 61 would perceive if the bezel 15 surrounded the window of the airplane 1. The bezel 15 may be provided with glass plates, in particular with glass plates equal to glass plates of an adjacent actual window in front of the display 14, in order to create a more convincing simulation of an actual window and to protect the display 14 from harm.

Figure 3:
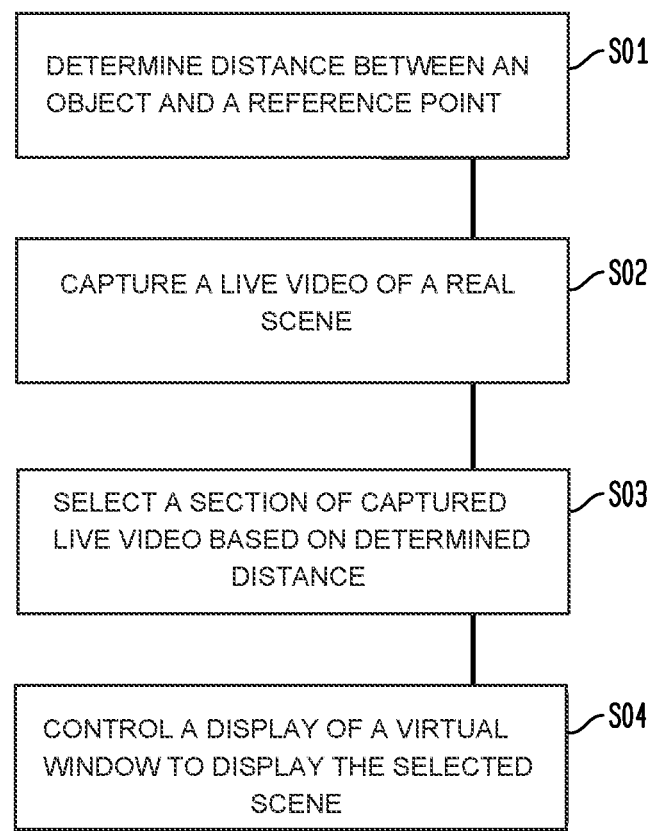
FIG. 3 shows a schematic flow diagram illustrating a method for operating a virtual window device according to an embodiment of the second aspect of the present invention.

FIG. 3 shows a schematic flow diagram illustrating a method for operating a virtual window device according to another embodiment of the invention. The method illustrated in FIG. 3 may be performed for example by, or for, or with the artificial window device 10 of FIG. 1 and FIG. 2 and may be adapted to all variations and modifications described with or for the artificial window device 10 in the foregoing.

In a method step S01, a distance 51 between an object, in particular a person, especially a face 61 of a person, and a reference point is determined, e.g. as described above with respect to the distance sensor unit 16. In a method step S02, a live video of a real scene 30 is captured, e.g. as described above with respect to the first camera unit 18.

In a method step S03, based at least on the determined distance 51, a section 32 of the captured live video of the real scene 30 is selected, e.g. as described above with respect to the computing unit 20. In a method step S04, a display 14 of a virtual window device 10 is controlled to display the selected section 32, e.g. as described above with respect to the computing unit 20.

Figure 4:
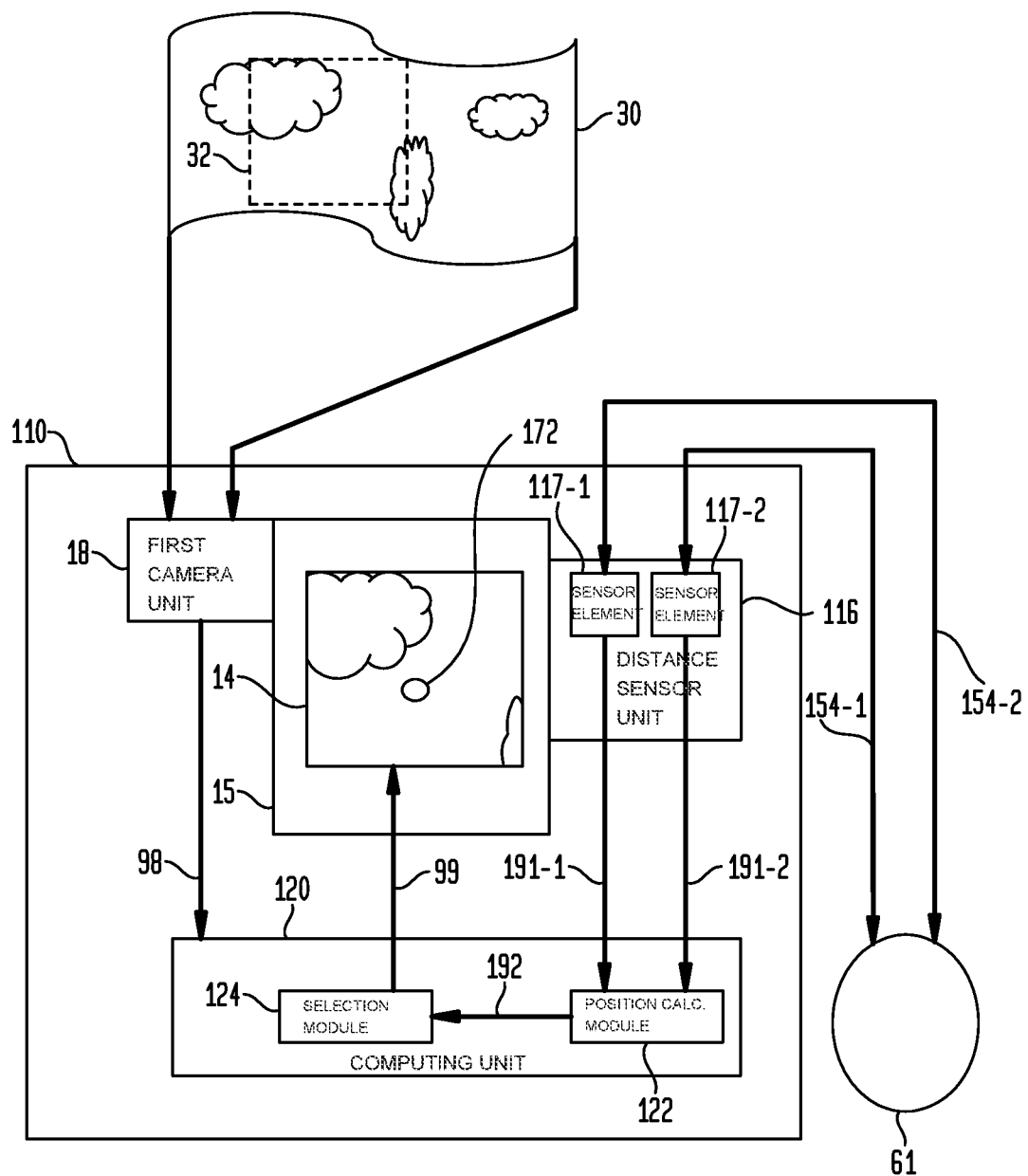
FIG. 4 shows a schematic block diagram of a virtual window device according to another embodiment of the first aspect of the present invention.

FIG. 4 shows a schematic block diagram of a virtual window device 110 according to another embodiment of the first aspect of the present invention. The virtual window device 110 is a variant of the virtual window device 10 and is adaptable to any modifications or variations described in the foregoing with respect to the virtual window device 10. The virtual window device 110 will also be described with respect to the following FIG. 5.

The virtual window device 110 is different from the virtual window device 10 in particular in a distance sensor unit 116 of the virtual window device 110 replacing the distance sensor unit 16 of the virtual window device 10 and in a computing unit 120 of the virtual window device 110 replacing the computing unit 20 of the virtual window device 10.

The distance sensor unit 116 comprises a plurality of sensor elements 117-1, 117-2 configured to produce each an individual first distance signal 191-1, 191-2 indicating an individual distance 154-1, 154-2 to the face 61, respectively. Although in FIGS. 3 and 4 two sensor elements 117-1, 117-2 are shown, for example three or more sensor elements are provided to enable, or improve, a triangulation of the face 61.

The computing unit 120 comprises a position calculation module 122. The position calculation module 122 is configured to calculate a position signal 192 indicating a position of the face 61 with respect to a reference point 172, based on the individual first distance signals 191-1, 191-2, for example by triangulation. The computing unit 120 may be realized with a processor and a memory and be configured by configuring software that the computing unit 120 is set to execute.

The reference point 172 is arranged, in the embodiment of FIG. 4, at a geometrical center of the display 14, e.g. its center of mass. The first and the second sensor elements 117-1, 117-2 may be advantageously provided at least at two different sides of the bezel 15, e.g. at two opposite sides, or on all sides of the bezel 15, in particular symmetrically with respect to the reference point 172. In this way, the position of the face 61 with respect to the reference point 172 may be determined with better precision.

The computing unit 120 comprises a selection module 124. The selection module 124 is configured to select the section 32 of the live video of the real scene 30 captured by the first camera unit 18 based, at least in part, on the calculated position signal 192, i.e. based on the position of the face 61.

The virtual window device 110 thus enables an even more precise and dynamically adapted selection of the section 32 such that the virtual window displayed by the display 14 changes in the same way, when a person comes closer to the display 14, as the visible section of an actual window would change for a person when that person came closer to the actual window, and similarly for a person moving away from the display 14.

Alternatively or additionally, the computing unit 120 may be configured to select the section 32 such that the virtual window displayed by the display 14 is identical, or very similar to, what an actual window located at the position of the display 14 would show to a person with a face 61 located at the position indicated by the position signal 192. The section 32 can be dynamically updated according to changes in the position signal 192 indicating changes of the position of the face 61. In other words, the solid angle with which the section 32 is selected may be chosen such as to correspond to the solid angle of view 34 of the face 61 located at the position indicated by the position signal 192. That solid angle of view 34 may be computed by taking the position indicated by the position signal 192 as a vertex of a solid angle delimited by a contour of the display 14.

Alternatively, or in addition, the selection module 124 may be configured to select the section 32 based on the plurality of individual first distance signals 191-1, 191-2. In this case, the plurality of individual first distance signals 191-1, 191-2 taken together may be termed the position signal 192.

The position calculation module 122 and/or the selection module 124 may e.g. be configured with separate processors and/or memories, or they may be realized as software modules of software executed by the computing unit 120.

Figure 5:
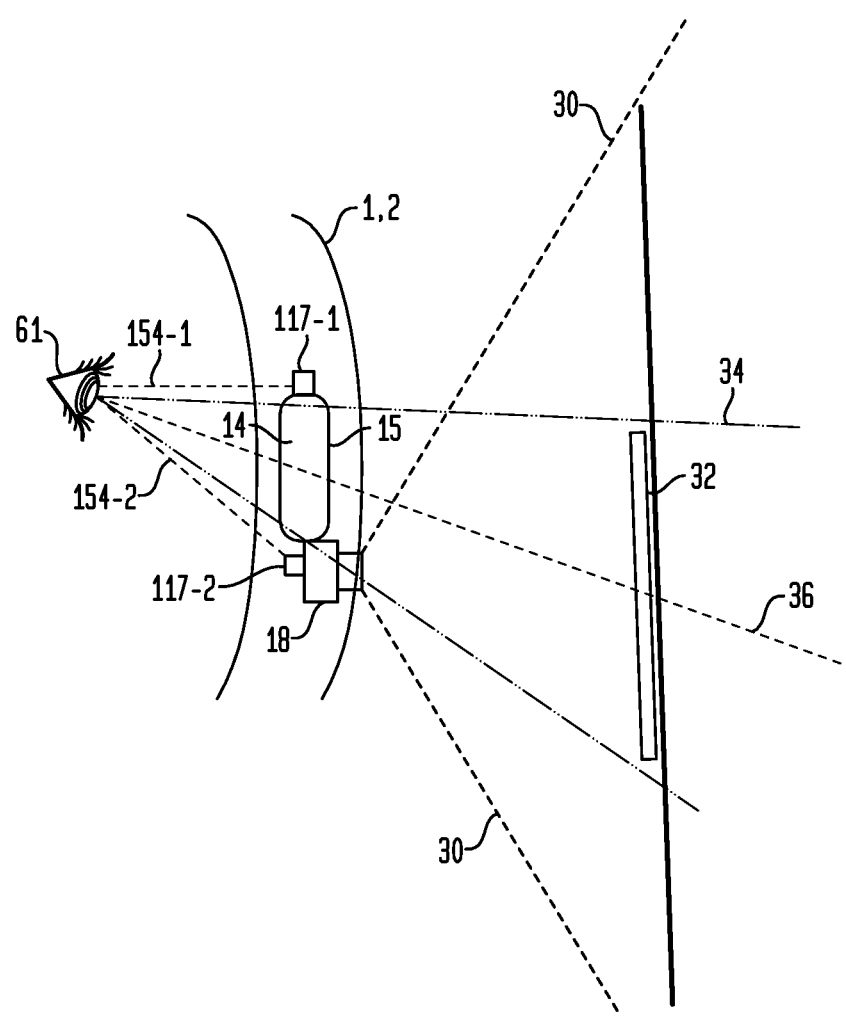
FIG. 5 shows a schematic diagram illustrating the function of the virtual window device of FIG. 4.

FIG. 5 shows a schematic diagram illustrating the function of the virtual window device 110 according to FIG. 4.

In FIG. 5, a first sensor element 117-1 of the distance sensor unit 116 and a second sensor element 117-2 of the distance sensor unit 116 are shown as arranged on two opposite sides of the bezel 15, in particular, the first sensor element 117-1 above the bezel 15 and the second sensor element 117-2 below the bezel 15. When the face 61 (symbolized by a single eye) is located somewhat upwards of the bezel 15, for example when a person is standing in front of the bezel 15, the first distance signal 191-1 produced by the first sensor element 117-1 indicates a comparatively shorter individual first distance 154-1, whereas the first distance signal 191-2 produced by the second sensor element 117-2 indicates a comparatively individual first distance 154-2.

The position calculation module 122 may be configured to determine in this situation that the face 61 is located at a position upwards of the reference point 172 so that the section 32 displayed by the display 14 may be chosen corresponding to a viewing angle originating from above the display 14, as described above.

In addition or alternatively, a viewing axis 36 of the person with the face 61 may be calculated by the computing unit 120, in particular by the position calculation module 122. The viewing axis 36 may be calculated as a line passing through the position of the face 61 indicated by the position signal 192 and through the reference point 172, especially through the geometrical center of the display 14. From the viewing axis 36 and a known main viewing axis of the display 14, which can extend perpendicularly to the display 14 from the reference point 172, a viewing angle of the face 61 may be calculated, cf. also FIG. 8 for illustration.

The selection module 124 may be configured to select the section 32 also based on the viewing angle. In the event that multiple faces 61 are determined before the display 14, the section 32 may be based on the viewing angle of the face 61 with the smallest viewing angle.

Figure 6:
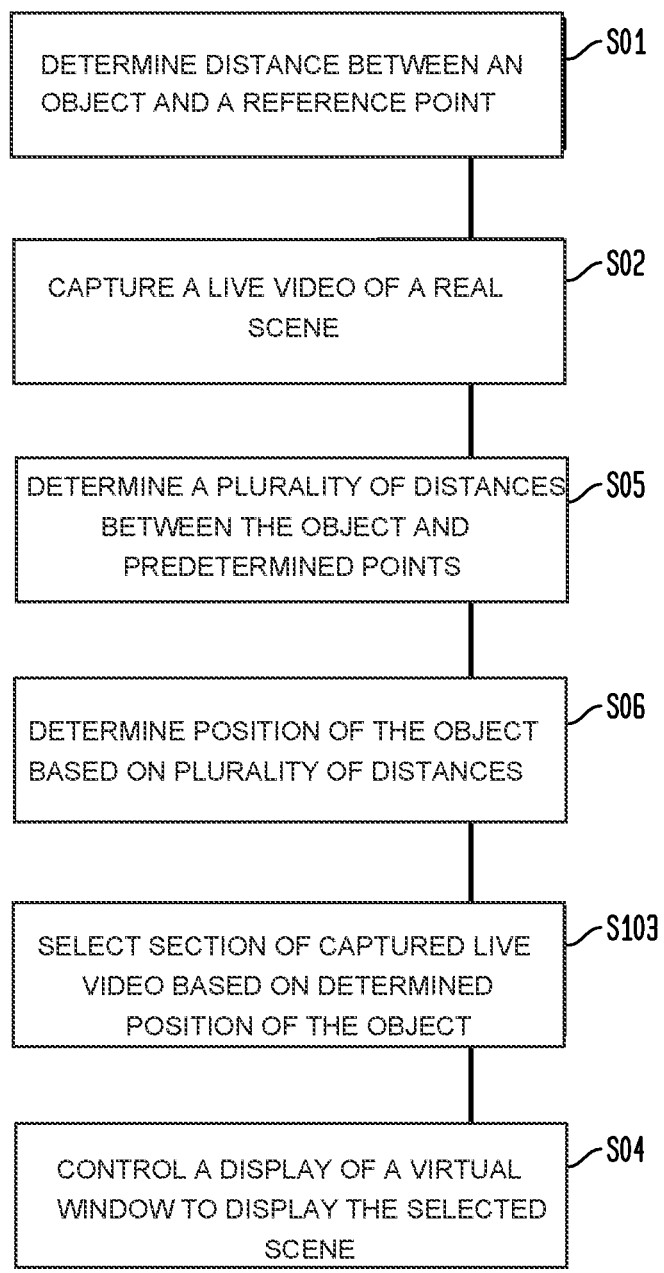
FIG. 6 shows a schematic flow diagram illustrating a method for operating a virtual window device according to another embodiment of the second aspect of the present invention.

FIG. 6 shows a schematic flow diagram illustrating a method for operating a virtual window device according to another embodiment of the second aspect of the present invention. The method illustrated in FIG. 6 may be performed for example by the artificial window device 110 of FIG. 3 and FIG. 4 and may be adapted to all variations and modifications described with for the artificial window device 110 in the foregoing.

The method described with reference to FIG. 6 is a variant of the method described with reference to FIG. 3 and differs from that method by a modified step S103 instead of the step S03 and by comprising the following additional method steps:

In a method step S05, a plurality of first distances 154-1, 154-2 to the object 61 is determined. In particular, the plurality of first distances is a plurality of distances between the object 61 and predetermined points, wherein the predetermined points 117-1, 117-2 can be locations of sensor elements 117-1, 117-2. The determining S05 of the plurality of first distances 154-1, 154-2 may be conducted as described above with reference to the distance sensor unit 116. The object 61 may in particular be a person's face.

In a method step S06, a position of the object 61 is determined, for example calculated, based on the plurality of measured first distances 154-1, 154-2, for example as described above with respect to the computing unit 120 and the position calculation module 122.

In the method step S103, the section 32 of the captured live video of the real scene 30 is selected based on the determined position of the object 61, for example, as described above with respect to the computing unit 120 and the selection module 124.

Figure 7:
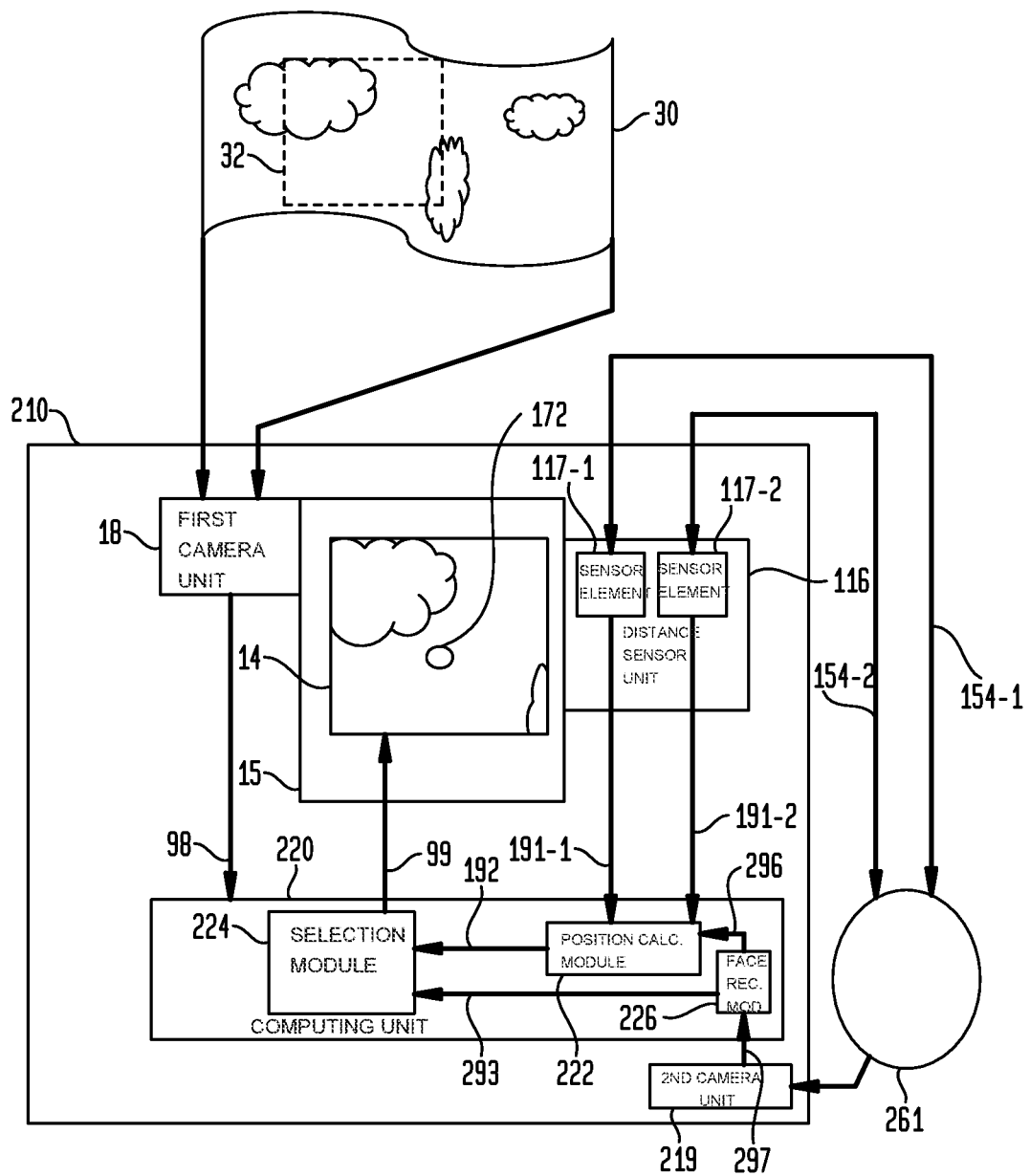
FIG. 7 shows a schematic block diagram of a virtual window device according to yet another embodiment of the first aspect of the present invention.

FIG. 7 shows a schematic block diagram of a virtual window device 210 according to yet another embodiment of the first aspect of the present invention. The virtual window device 210 will also be described with respect to the following FIG. 8. The virtual window device 210 is a variant of the virtual window device 110 and is adaptable to any modifications or variations described in the foregoing with respect to the virtual window device 110.

The virtual window device 210 is different from the virtual window device 110 in particular in a computing unit 220 of the virtual window device 210 replacing the computing unit 120 of the virtual window device 110, and in that the virtual window device 210 comprises a second camera unit 219.

The second camera unit 219 is configured and arranged to capture a picture or a video of a space in front of the display 14. Continuing the example from the previous figures, wherein the display 14 was formed or arranged in, or attached to, a wall 2 of an airplane 1, the second camera unit 219 may be configured and arranged to capture a picture or a video from a space inside the airplane 1, in front of the display 14. The picture or video captured by the second camera unit 219 is transmitted to a face recognition module 226 of the computing unit 220 in a data signal 297.

Figure 8:
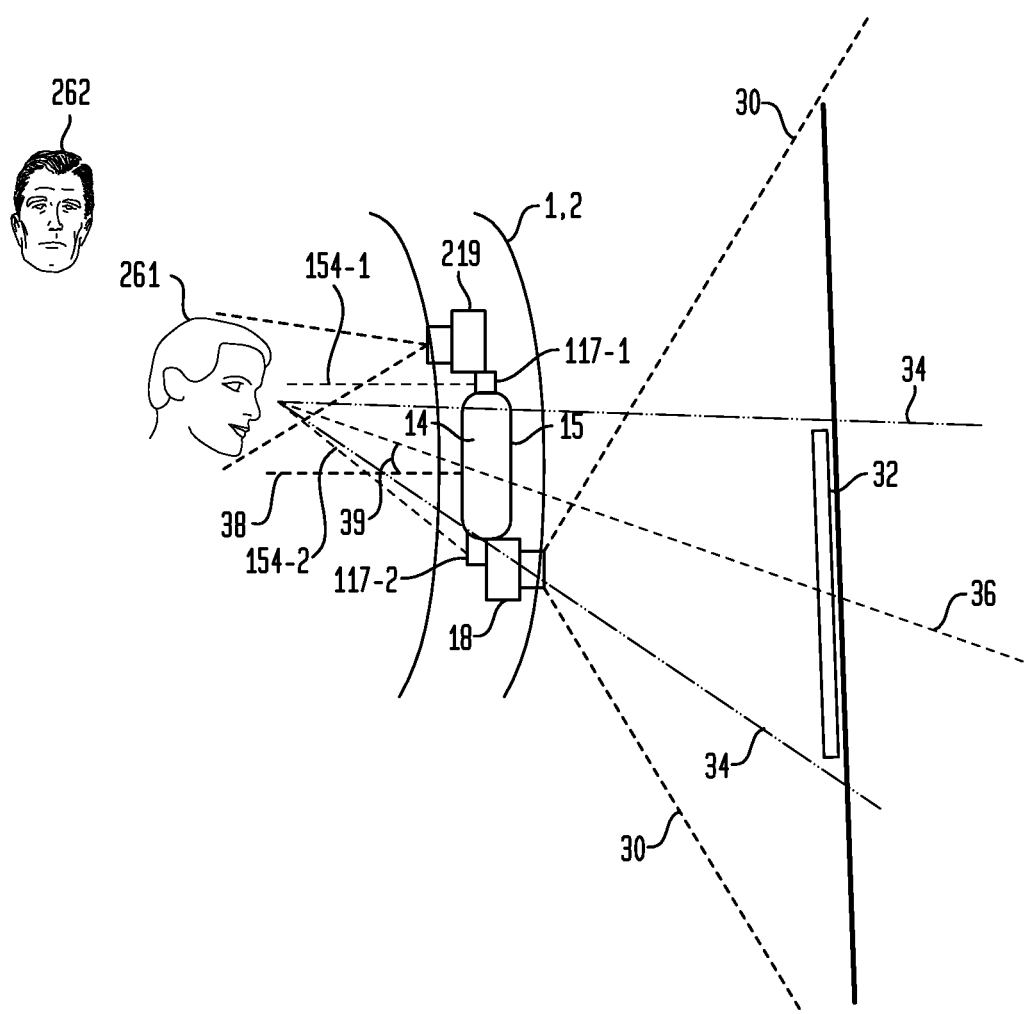
FIG. 8 shows a schematic diagram illustrating the function of the virtual window device of FIG. 7.

The face recognition module 226 is configured to recognize at least one face 261, 262 in the captured picture or video of the space in front of the display 14 based on the data signal 297, as is visualized in FIG. 8. The face recognition module 226 may transmit information indicating the recognized faces 261, 262, for example to a position calculation module 222 of the computing unit 220 in a data signal 296. The position calculation module 222 may be configured to process the individual first distance signals 191-1, 191-2 in the same way as the position calculation module 122 of the computing unit 120 of the virtual window device 110. The position calculation module 222 may further be configured to determine, based on the data signal 296 indicating the recognized faces 261, 262, the positions of all of the recognized faces 261, 262 based on the plurality of individual first distance signals 191-1, 191-2.

The face recognition module 226 may further be configured to determine a spatial orientation of the at least one recognized face 261, 262 and to produce a face orientation signal 293 indicating at least the determined spatial orientation of the at least one recognized face 261, 262. The face recognition module 226 may, for example, comprise a processor and a memory, or it may be realized as part of the computing unit 220, e.g. as a software module of a software executed by the computing unit 220.

The computing unit 220 may be configured as described with respect to the computing unit 120 of the virtual window device 110 and may further be configured to select the section 32 of the live video of the real scene 30 captured by the first camera unit 18 also based on the face orientation signal 293. In particular, the determined face orientation of the recognized faces 261, 262 may replace, or supplement, the information about the viewing angle of the person with the face 261.

Thus, the a selecting module 224 of the computing unit 220, which may in other respects be configured in the same way as the selecting module 124 of the computing unit 120 of the virtual window device 110, may be configured to select the section 32 based on, for example:
- the distance of the face 261, 262 from the reference point 172, in particular from a geometrical center of the display 14, and the face orientation signal 293 indicating the respective orientation of the face 261, 262;
- the plurality of first distance signals 191-1, 191-2 and the face orientation signal 293 indicating the face orientation of the face 261, 262;
- the distance of the face 261, 262 from the reference point 172 and/or the plurality of first distance signals 191-1, 191-2 only, for example in the event that a determination of the face orientation of the recognized faces 261, 262 has failed.

The selection module 224 may then, based on the above and/or as has been described in detail with respect to the selection module 124 of the computing unit 120 of the virtual window device 110, select the section 32 such that the display 14 displays a virtual window that is identical, or very similar, to a section of the real scene 30 that the person with the face 261, 262 would see through an actual window located at the position and with the shape of the display 14.

In the event that a plurality of faces 261, 262 is recognized by the face recognition module 226, the selection module 224 may further be configured to determine a preferred face 261 among the recognized faces, and to select the section 32 such that the display 14 displays a virtual window that is identical, or very similar, to a section of the real scene 30 that the person with the preferred face 261 would see through an actual window located at the position and with the shape of the display 14. The preferred face 261 may be selected based on e.g. its distance from the reference point 172 and/or on its viewing angle (based on the individual first distance signals 191-1, 191-2 and/or on the face orientation signal 293).

In order to determine the preferred face 261, the selection module 224 may first create a pre-selection of faces 261, 262.

For example, the selection module 224 may be configured to first calculate, based on the face orientation signals 293 for the recognized faces 261, 262 (and/or on the individual first distance signals 191-1, 191-2), a viewing angle 39 between a viewing axis 36 of each recognized face 261, 262 and a predetermined main viewing axis 38 of the display 14 for each recognized face 261, 262, as illustrated in FIG. 8. The selection module 224 may further be configured to calculate a second distance of each recognized face 261, 262 from the reference point 172, e.g. based on the position signal 292 for each recognized face 261, 262 and/or based on the individual first distance signals 191-1, 191-2.

As a first example, the selection module 224 may be further configured to determine the pre-selection of recognized faces 261, 262 as containing all recognized faces 261, 262 with a respective calculated viewing angle 39 below a predetermined threshold angle value, for example, sixty degrees, forty-five degrees, or thirty degrees. The selection module 224 may be further configured to then determine the preferred face 261 as the face within the pre-selection of recognized faces 261, 262 which is located at the smallest second distance from the reference point 172.

As a second example, the selection module 224 may be further configured to determine the pre-selection of recognized faces 261, 262 as containing all recognized faces 261, 262 with a second distance from the reference point 172 below a predetermined, or adjustable, threshold distance value, based on their respective position signals 292. For example, the threshold distance value may be five meters, or one meter. The selection module 224 may be further configured to then determine the preferred face 261 as the face within the pre-selection of recognized faces 261, 262 with the smallest calculated viewing angle 39. This second example is schematically illustrated in FIG. 8.

FIG. 8 shows a schematic diagram illustrating the function of the virtual window device 210 of FIG. 7. If it is assumed that both a first face 261 and a second face 262 have been recognized and entered into the pre-selection of recognized faces, the selection module 224 may then, based on the calculated viewing angles 39 of the faces 261, 262, decide which one is the preferred face, and control the display 14 to display a section 32 based on the viewing angle 39, or viewing axis 36, of the person with the preferred face.

In FIG. 8 it is assumed that the person with the first face 261 is looking relatively directly at the display 14, such that it has a viewing angle 39 with respect to the main viewing axis 38 of the display 14 of about 20 degrees. The person with the second face 262 only barely perceives the display 14 at all. Accordingly, the first face 261 is selected as the preferred face and the display 14 is controlled to display the section 32 based on parameters (distances, viewing angle) of the first face 261.

Figure 9:
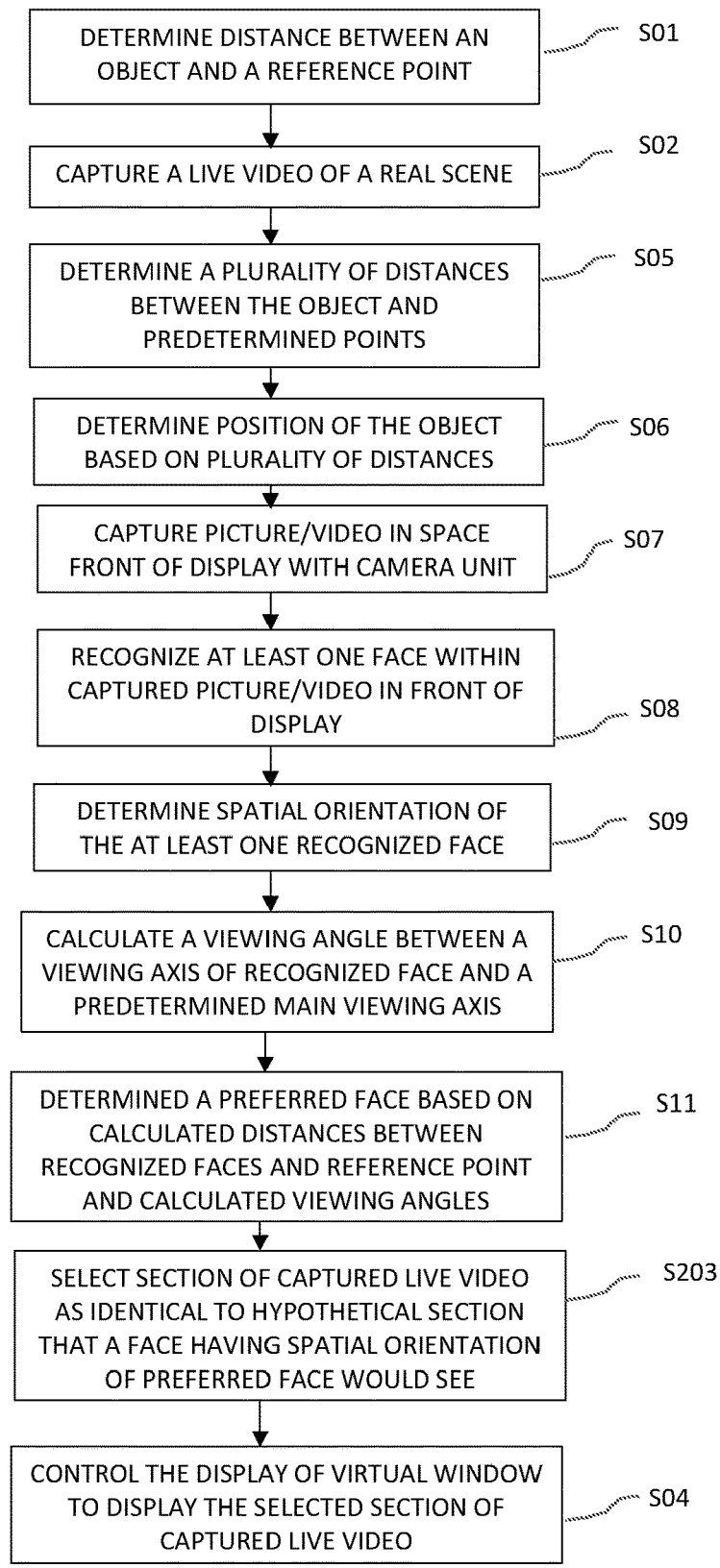
FIG. 9 shows a schematic flow diagram illustrating a method for operating a virtual window device according to yet another embodiment of the second aspect of the present invention.

FIG. 9 shows a schematic flow diagram illustrating a method for operating a virtual window device according to yet another embodiment of the second aspect of the present invention. The method illustrated in FIG. 9 may be performed for example by the artificial window device 210 of FIG. 7 and FIG. 8 and may be adapted to all variations and modifications described with for the artificial window device 210 in the foregoing.

The method described with reference to FIG. 9 is a variant of the method described with reference to FIG. 6 and differs from that method by a modified step S203 instead of the step S103 and by comprising the following additional method steps:

In a method step S07, a picture or a video of a space in front of the display 14 is captured, e.g. as described above with respect to the second camera unit 219 of the virtual window device 210.

In a method step S08, at least one face 261, 262 within the captured picture or video of the space in front of the display 14 is recognized. In a method step S09, a spatial orientation of the at least one recognized face 261, 262 is determined. Step S08 and/or step S09 may be performed e.g. as described above with respect to the face recognition module 226 of the virtual window device 210.

In a method step S203, replacing the method step S103 of the method of FIG. 6, a section 32 of the captured live video of the real scene 30 is selected based at least on the spatial orientation of the at least one recognized face 261, 262, in addition to based on the determined position of the at least one recognized face 261, 262.

A plurality of faces 261, 262 may be recognized in the captured picture or video of the space in front of the display 14. For each recognized face 261, 262, a respective distance between the recognized face 261, 262 and the reference point 172 may be calculated, e.g. based on the respective position signal 292 and/or directly on the individual first distance signals 191-1, 191-2.

The method may comprise some, or all of, the following additional method steps:

In a method step S10, a viewing angle between a viewing axis 36 of each of the recognized faces 261, 262 and a predetermined main viewing axis 38 of the display 14 for each of the recognized faces 261, 262 is calculated. In a method step S11, a preferred face 261 is determined based on the calculated distances between the recognized faces 261, 262 and the reference point 172, as well as based on the calculated viewing angles 39.

In the method step S203, the section 32 of the captured live video of the real scene 30 may be selected as identical to a hypothetical section that a person with a face having the spatial orientation of the preferred face 261 would see through a bezel 15, or a frame, surrounding the display 14 if the bezel 15, or the frame, surrounded an opening or a window instead of the display 14.

The method steps S10, S11 and S203 may be performed e.g. as described with respect to the selection module 224 of the virtual window device 210 and/or with respect to the selection module 124 of the virtual window device 110.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A virtual window device comprising:
a bezel, or a frame, with a display arranged within the bezel, or within the frame;
a first distance sensor unit configured to produce at least one first distance signal indicating a first distance to an object and arranged adjacent to the bezel or the frame or arranged within the display;
a first camera unit configured to capture a live video of a real scene; and
a computing unit configured to select, based at least on the at least one first distance signal, a section of the live video of the real scene captured by the first camera unit;
a second camera unit configured and arranged to capture a picture or a video of a space in front of the display; and
a face recognition module configured to recognize a face in the captured picture or video of the space in front of the display, to determine a spatial orientation of the recognized face and to produce a face orientation signal indicating at least the determined spatial orientation of the recognized face,
wherein the computing unit is further configured to control the display to display the selected section,
wherein the computing unit is further configured to select the section of the live video of the real scene captured by the first camera unit also based on the face orientation signal,
wherein the face recognition module is configured to recognize a plurality of faces in the picture or video captured by the second camera unit;
wherein the first distance sensor unit is configured to produce at least one first distance signal indicating a respective first distance to each of the recognized faces;
wherein the computing unit is configured to determine, based at least on the at least one first distance signal for each recognized face, a position signal indicating a position of each recognized face with respect to a common reference point;
wherein the computing unit is further configured to select the section of the real scene captured by the first camera unit also based on the position signals,
wherein the face recognition module is configured to produce a plurality of face orientation signals indicating a spatial orientation of the respective recognized face;
wherein the computing unit is further configured to select the section of the live video of the real scene captured by the first camera unit also based on the plurality of face orientation signals,
wherein the computing unit is further configured to determine a preferred face among the plurality of recognized faces based on at least one of the plurality of face orientation signals and on the plurality of position signals;
wherein the first camera unit is arranged and configured to capture the live video of the real scene from an area behind the display; and
wherein the computing unit is configured to select the section of the live video of the real scene captured by the first camera unit such that, based on the face orientation signal belonging to the preferred face, the selected section is identical to a hypothetical section that a person with a face having the spatial orientation of the preferred face would see through the bezel, or the frame, if the bezel, or the frame, surrounded an opening or a window instead of the display.

2. The device of claim 1,
wherein the first distance sensor unit comprises a plurality of sensor elements configured to produce each an individual first distance signal indicating an individual distance to the object, respectively;
wherein the computing unit is configured to calculate a position signal indicating a position of the object with respect to a reference point, based on the individual first distance signals; and
wherein the computing unit is configured to select the section of the live video of the real scene captured by the first camera unit based on the calculated position signal.

3. The device of claim 1,
wherein the computing unit is further configured to calculate, based on the plurality of face orientation signals, a viewing angle between a viewing axis of each recognized face and a predetermined main viewing axis of the display for each recognized face; and
wherein the computing unit is further configured to determine the preferred face based on the position signals and on the calculated viewing angles.

4. The device of claim 3,
wherein the computing unit is further configured to determine a pre-selection of recognized faces containing all recognized faces with a second distance of each recognized face from the reference point below a predetermined threshold distance value, based on the position signals; and
wherein the computing unit is further configured to determine the preferred face as the face within the pre-selection of recognized faces with the smallest calculated viewing angle.

5. The device of claim 3,
wherein the computing unit is further configured to determine a pre-selection of recognized faces containing all recognized faces with a respective calculated viewing angle below a predetermined threshold angle value; and
wherein the computing unit is further configured to determine the preferred face as that face within the pre-selection of faces which is located, based on its position signal, at the smallest second distance from the reference point.

6. A method for operating a virtual window device, comprising:
determining a distance between an object and a reference point using a distance sensor and arranged adjacent to a bezel or a frame or arranged within a display;
capturing a live video of a real scene;
selecting, based at least on the determined distance, a section of the captured live video of the real scene;
controlling the display of the virtual window device to display the selected section;
capturing a picture or a video of a space in front of the display;
recognizing at least one face within the captured picture or video of the space in front of the display; and
determining a spatial orientation of the at least one recognized face;
wherein the selecting of the section of the captured live video of the real scene is based also on the spatial orientation of the at least one recognized face,
wherein a plurality of faces is recognized in the captured picture or video of the space in front of the display; and wherein, for each recognized face, a respective distance between the recognized face and the reference point is calculated; and wherein the method further comprises:

calculating a viewing angle between a viewing axis of each of the recognized faces and a predetermined main viewing axis of the display for each of the recognized faces;

determining a preferred face based on the calculated distances between the recognized faces and the reference point as well as based on the calculated viewing angles; and wherein the selecting of the section of the captured live video of the real scene is selected as identical to a hypothetical section that a person with a face having the spatial orientation of the preferred face would see through a bezel, or a frame, surrounding the display if the bezel, or the frame, surrounded an opening or a window instead of the display.

7. The method of claim 6, further comprising:

determining a plurality of first distances to the object; and determining a position of the object based on the plurality of measured first distances;

wherein the selecting of the section of the captured live video of the real scene is based also on the determined position of the object.

8. The device of claim 1, wherein the first distance sensor is arranged at a geometric center of the display.

9. The device of claim 1, further comprising a second distance sensor, wherein the first distance sensor and second distance sensor are arranged on two different sides of the bezel.

* * * * *